Oct. 12, 1948.  C. J. HORNKOHL ET AL  2,450,962
DOUGHNUT COOKING ART

Filed May 28, 1945  2 Sheets-Sheet 1

Inventors:
Carl J. Hornkohl and
Freeland H. Leslie
By: A. Trevor Jones
Atty.

Inventors:
Carl J. Hornkohl and
Freeland H. Leslie

Patented Oct. 12, 1948

2,450,962

UNITED STATES PATENT OFFICE 2,450,962

DOUGHNUT COOKING ART

Carl J. Hornkohl and Freeland H. Leslie, Chicago, Ill.; said Leslie assignor to said Hornkohl Application May 28, 1945, Serial No. 596,198

8 Claims. (Cl. 99—409)

This invention relates to doughnut cooking art and more particularly to the cooking or frying of the food product known as "raised doughnuts" which comprise yeast raised sweet-goods dough as distinguished from the cake or pastry dough from which the more common variety of doughnuts are made.

It is well known that such raised doughnuts cannot be advantageously made by the conventional doughnut making machinery since, for one reason, the raised doughnuts must be permitted to proof or raise after being formed into doughnut shape and before being fried or cooked, and for the production of good raised doughnuts it is desirable that the raised dough be handled as little as possible after raising, which renders the usual machine handling undesirable for this product. At the same time, the individual frying of raised doughnuts is prohibitive in cost for large scale production.

It is an object of the present invention to provide mechanical means by which a quantity of such raised doughnuts may be cooked at one time, with a minimum of handling of the doughnuts between the proofing and frying steps, and thereby contributing both to reduced cost and to the production of a highly edible and tender food product which closely approximates home cooking wherein the raised doughnuts are individually handled, and in which grease absorption is eliminated or markedly minimized.

It is to be understood that the term "doughnuts" is here intended to include any fried dough, batter or pastry product whether of conventional ring doughnut shape or of ball shape, say, among which latter is the food product known as "bismarcks" and which may include jelly or custard inserted into the product after cooking, or of say the elongated, twisted form of crullers.

The invention will be understood by reference to the accompanying drawings, which are made a part of this specification, and the foregoing and other objects and advantages will be apparent from the following description, taken together with the drawings, showing an illustrative embodiment of the invention, and in which drawings—

Figure 3:
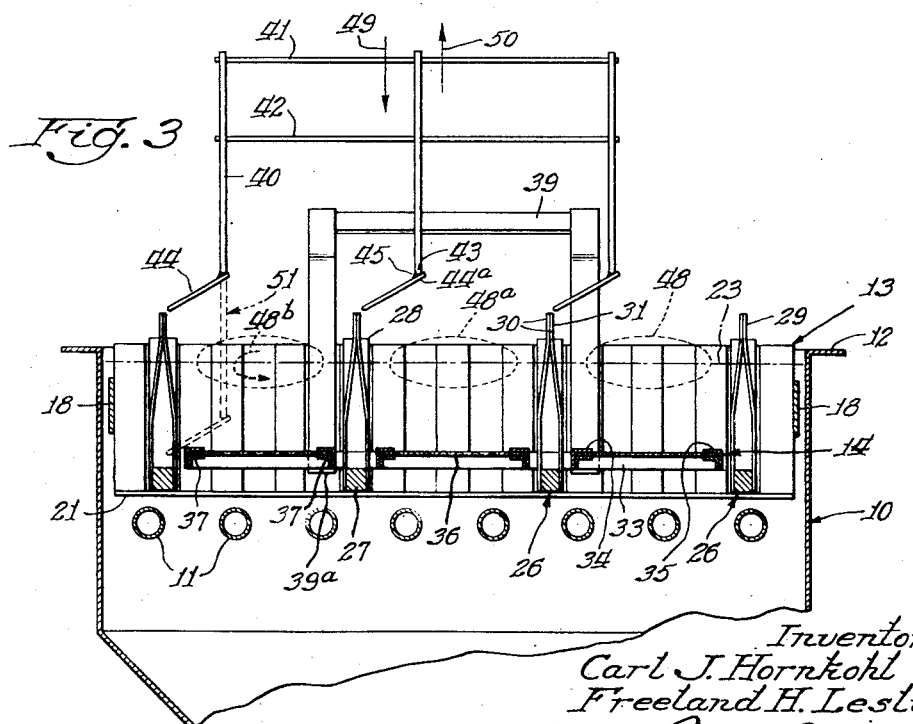
Figure 3 is a vertical sectional view of parts shown in Figs. 1 and 2 and being a section taken on the line 3—3 of Figure 2, and showing in dotted lines an alternative position of one of the parts.

Referring in detail to the illustrative construction shown in the drawings, the present invention is adapted to be used with a kettle or other cooking utensil 10 which is intended to contain a cooking liquid such as hot grease or oil, made, for example, from lard or a vegetable cooking compound, the kettle 10 thus providing a hot fluid reservoir for cooking or frying the doughnuts by the usual flotation method, the doughnuts normally floating on the hot deep fat. The liquid may be heated and maintained hot by any appropriate heating means, such as, for example, by the hot fluid coil pipes 11 (Fig. 3). In the embodiment here illustrated the kettle 10 may commonly have a marginal flange 12 about its top.

In the present embodiment, the expedients proper of the present invention, for use with the kettle 10, comprise a kettle frame 13, a basket frame 14 and a turn-over frame 15, conveniently of metal and adapted to be associated as presently described while being separable selectively for the purposes indicated.

Turning first to the kettle frame 13, this as here shown comprises a pair of Z-beams 16 and 17 fixedly spaced apart by straps 18. The Z-beams 16 and 17 are angled in opposite directions and have along their upper edges outwardly extending flanges 19 and 20 and along their lower edges inwardly extending flanges 21 and 22, these latter flanges being thus directed toward each other to provide a somewhat box-like frame of a size corresponding substantially to the inner dimensions of the top of the kettle 10 and being insertable therein with the frame flanges 19 and 20 resting on the flange 12 of the kettle and supporting the kettle frame 13 within the upper regions of the kettle 10 just above the heating pipes 11. Thus when so inserted, the kettle frame is adapted to receive the frying fat up to say the liquid level indicated by the broken line 23 (Fig. 3).

In accordance with the present invention, the kettle frame 13 is vertically grooved at intervals spaced along the beams 16 and 17 as at 24, these grooves being here formed by spaced ribs or blocks 25 suitably secured as by welding to the beams. The blocks 25 extend downwardly to the flanges 21 and 22 and upwardly to be flush with the flanges 19 and 20. Insertable by a downward sliding movement into a pair of grooves 24 formed on beams 16 and 17, respectively, is a doughnut row divider 26, of which there are four here shown, and which, in this instance, divide the kettle frame 13 into three doughnut row receiving compartments. Each divider 26 includes a base 27 and uprights 28 at the end of the base, which latter slide snugly in the grooves 24 to permit the base 27 to be supported on the flanges 21 and 22. Fixed transversely of the kettle frame and in spaced apart relation on the base 27 of each divider are upstanding guides 29 of which may be conveniently formed of a pair of spring steel strips 30 welded together at their top as at 31 and spread apart at their lower ends and riveted as at 32 to opposite sides of the divider or separator base 27.

Further in accordance with the present invention, and as here shown in this instance, the present embodiment includes next a basket frame 14 already referred to and which in this instance may comprise a pair of runners 33 fixedly spaced apart by pairs of cross stringers 34 and 35 suitably secured thereto as by welding or the like. Each pair of cross stringers 34—35, of which there are here shown three such pairs, constitute hangers for a metal screen 36 suitably secured to the cross stringers of a pair. In this instance, as best seen in Figure 3, the cross stringers 34 and 35 are of angular formation including lapped laminations and the wire screen 36 may be advantageously clamped as at 37 by its margins between these laminations.

The runners 33 of the basket 14 are of a length such that the basket frame may be received in the kettle frame and each screen and its supporting stringers 34—35—36 is of a width such that it may be received between a pair of dividers 26, the dividers passing up through the spaces 38 between the screens so that the runners 33 may rest transversely on the divider bases 27. Each basket frame 14 may be provided with a pair of handles 39 by which it may be conveniently lowered into and lifted from the kettle frame 13 and from the relationship thereto just described. The handles 39 may be separable from the basket frame and clipped thereunder as at 39a.

Finally, in accordance with the present invention, the expedients here disclosed and in the present embodiment include the turn-over frame 15, also already referred to. This turn-over frame 15 as here shown includes a plurality of, and in this instance three, U-shape vertical struts 40, conveniently of wire rod formation, and fastened together by the tie rods 41 and 42 to be somewhat rigidly secured together in the relationship described, the wire rod construction advantageously however having some yielding action as well as contributing to lightness and cleanability. The bights 43 of each of the U-struts 40 are at the lower end of the U and secured to these bights spaced therealong and extending angularly therefrom are a series of doughnut contacting fingers 44 desirably of loop formation having their otherwise free ends 44a welded as at 45 to the bight 43 and their outer ends rounded as at 46.

Figure 1:
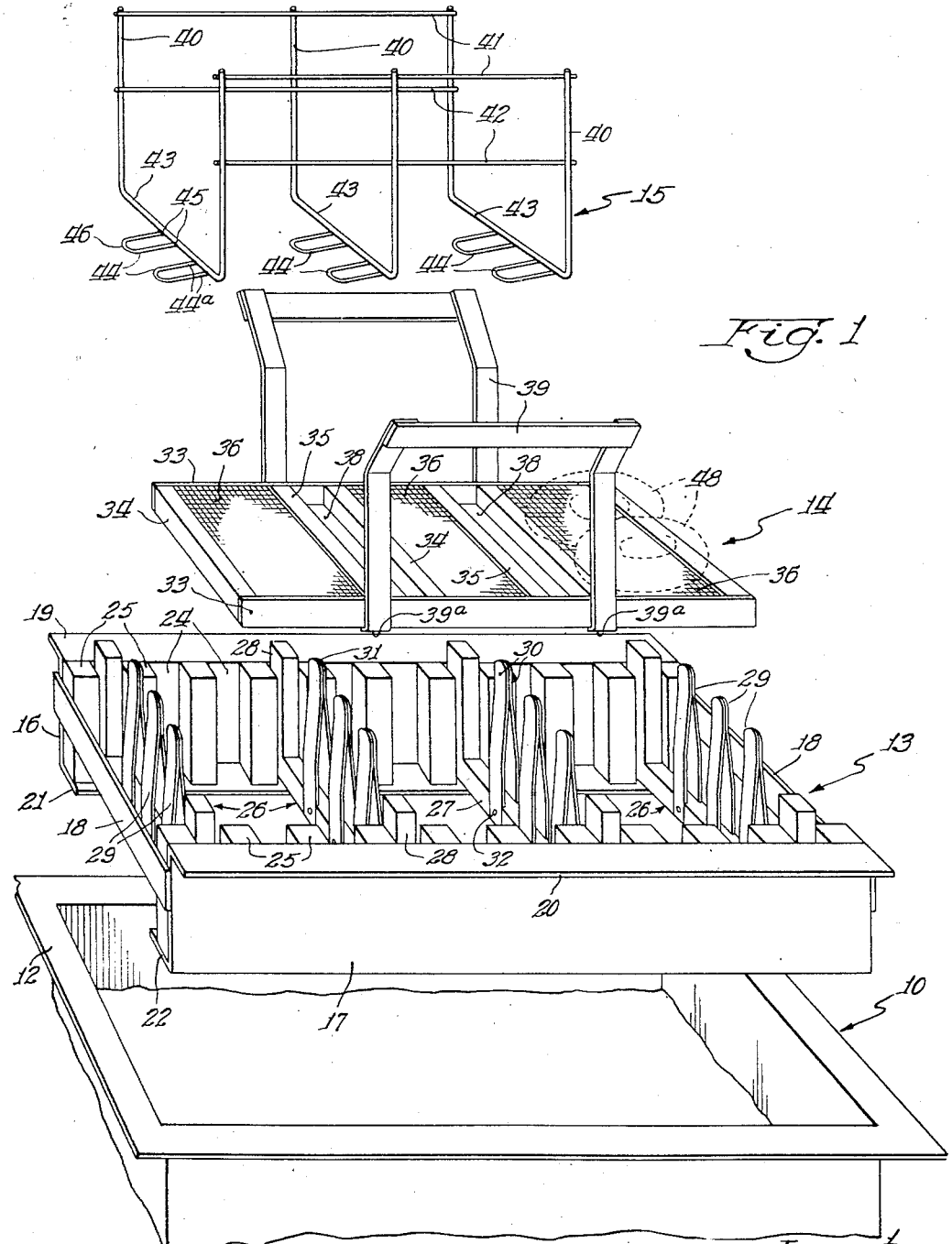
Figure 1 is a somewhat schematic separated view of associated parts used in the practice of the present invention.
Figure 2:
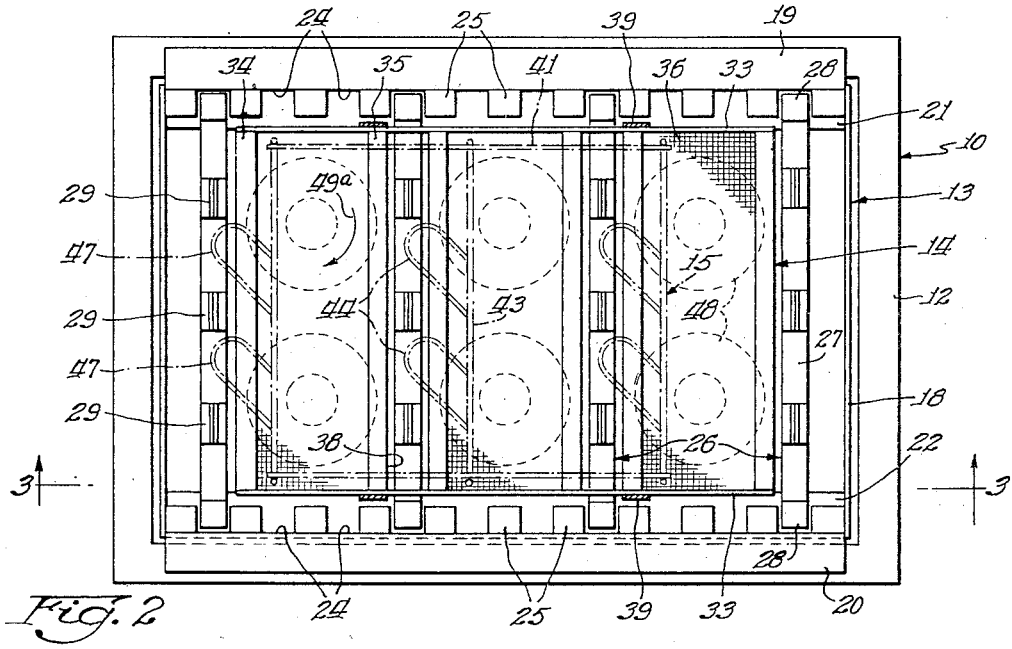
Figure 2 is a slightly reduced plan view of the parts shown in Figure 1 but in assembled relation for the cooking step.

The fingers 44, in accordance with the present invention, extend angularly in two directions from the bight 43, namely in one direction which is downward from the plane of the bights, as best seen in Figure 3, and in another direction which is oblique to the bight as best seen in Figure 2, the purpose of which will be later pointed out, it being noted for the present that the entire turn-over frame 15 is adapted to be lowered into the kettle frame 13, say after the basket frame 14 is also received therein, and each of the struts 40 entering one of the compartments formed between dividers 26 and each of which, when the basket frame 14 is therein, is bottomed by one of the screens 36. For this purpose, the distance between the upright portions of each strut 40 is just slightly less than the length of the stringers 34—35—36, and the spacing apart of the struts 40 by the tie rods 41 and 42 is such that each strut will register with one of the screens 36. In so doing, the arrangement is such that the fingers 44 on each bight 43 of the struts 40 are received as at 47 between a pair of guides 29, to guide the fingers into contact each with a doughnut as later more particularly described. Thus the guides 29 provide guides not only for the entry of the basket frame 14 into the kettle frame but also for the entry of the turn-over frame 15 in a somewhat similar manner, and when the latter frame is so received the bights 43 for each row of doughnuts are also arranged to contact the doughnuts of a row, just after the fingers 44 have done so, at a portion of the doughnut spaced to one side of a line passing through the centers of the doughnuts in that row, also for a purpose more particularly later described.

It is here timely to point out that while, for present illustrative purposes, only three rows of doughnuts are shown and only two doughnuts in each row, by the sectional arrangements of each of the kettle frame, basket frame, and turn-over frame, this is merely to exemplify the embodiment of the invention here specifically shown and the invention is capable of being adapted to frames having a larger area and which might well include a larger number of rows of doughnuts as well as a greater number of doughnuts in each row. In any case, each section of the frames defines a row. Furthermore, with the same size kettle frame here shown, a larger number of rows, say four, could be provided for, by moving the intermediate dividers 26 each to a groove 24 nearer to the adjacent end of the kettle frame and placing an additional divider (not here shown) in the middle groove 24, thus accommodating a basket frame and turn-over frame adapted for a doughnut of slightly smaller diameter.

Operation of the device, as already alluded to, will now be more particularly described as follows:

After the raw or uncooked doughnuts, which are here indicated by the numeral 48, have been formed from the dough in the usual manner they may be disposed in rows upon the sections of a basket frame 14, each screen 36 thereof defining one section of the frame and therefore one row of the doughnuts. This is done of course before the basket frames are introduced into the frying kettle. The doughnuts are spaced apart in a row in any suitable manner but at least, desirably, at a distance apart less than the diameter of the doughnut for the purpose of fully utilizing the space and also of contributing to the effective operation of the device as next described. The doughnuts 48 may remain on the basket frame 14, say, when this has been filled with doughnuts as described, and until the dough is proofed or raised to a suitable height. During this time the basket frame may be deposited in the usual rack containers.

When the doughnuts of a given basket frame have raised suitably, the basket frame may then be lowered into the kettle frame 13 as already explained and as shown in Figures 2 and 3, the kettle frame at this time being immersed in the cooking liquid. Consequently, after an interval of cooking the doughnuts will float up from the screens 36 and, as at 48a, will float partially submerged upon the surface 23 of the hot fat, the temperature of which is desirably maintained at approximately 350° while the doughnuts are frying.

When a sufficient interval of time has elapsed, say, approximately a minute, for frying the doughnuts on one side, the turn-over frame 15 is then lowered into the kettle frame 13, the tie bars 41 conveniently serving as handles for the turn-over frame for this purpose. As the turn-over frame is so lowered, as indicated by the arrow 49 (Fig. 3), one of the fingers 44 (of which it will be understood there are enough to contact all the doughnuts in a row) will contact the doughnut just below it, and, by reason particularly of the peculiar angular arrangement of the fingers 44, each doughnut will be given a spinning or rotative movement as indicated by the arrow 49a (Fig. 2), and then as the bight 43 itself strikes all of the doughnuts in its particular row, the doughnuts will be simultaneously inverted or turned over, as indicated by the arrow 48b (Fig. 3) so that they will then fry on their reverse side. Since the doughnut rows are confined by the dividers or separators 26, and the doughnuts in a row are confined each by the other, lateral movements of the doughnuts is limited so that they are always in position to be contacted by the turn-over frame.

By reason of the light contact of the fingers 44 with the doughnut and the spinning action thereby given to the doughnut, it has been found that it will turn over quickly and readily with a minimum of agitation of the hot fat and a minimum marking of the doughnut. In this manner all of the doughnuts in all of the rows are turned over at the same time so that the cooking period for each doughnut is exactly the same and may thus be controlled to an exact period which contributes to the production of a highly edible and tender product, with minimum fat absorption and a substantial saving in cooking fat consumption, since fat absorption begins immediately and proceeds rapidly as soon as the goods are done on that side. It is fat absorption that toughens the product and makes it less edible.

It is to be understood that during the frying of the doughnut on its reverse side as just described, the turn-over frame 15 will remain in the kettle, at this time occupying a position indicated, as in dotted lines in Figure 3, without interfering with the doughnuts, the bights 43 and their attached fingers 44 being below the doughnut and out of the way at this time.

When the frying of the doughnut on its reverse side has been completed, which again can be exactly timed for all of the doughnuts simultaneously, first the turn-over frame may be removed and then the basket frame 14 is lifted out of the kettle frame 13, by means of the handles 39, and also of course all of the doughnuts carried on the basket frame 14, and the basket frame is placed on the usual drain board where the excess fat runs back into the kettle.

It will be understood that equipment in accordance with the present invention may comprise a quantity of the basket frame 14 which may be successively introduced into the kettle.

The invention is not limited to details of construction or sequence of steps of operation herein described for exemplification of the invention. Furthermore, it may not always be essential to the practice of the invention that all features thereof be used conjointly and it is intended to be understood that various combinations or sub-combinations may at times be advantageously employed, and such changes may be made as fall within the scope of the appended claims without departing from the invention.

The invention having been described, what is here claimed is:

1. In a doughnut cooking means for use with doughnut row forming means, a turn-over frame including a plurality of U-shape vertical struts, a strut having its bight at its lower end and having a plurality of doughnut contact fingers spaced along said bight and extending angularly thereto, and means connecting and spacing the struts to register with the rows respectively.

2. In a doughnut cooking means embodying doughnut row forming means, a turn-over frame including a plurality of U-shape vertical struts, each strut having its bight at its lower end and having a plurality of doughnut contact fingers spaced along said bight and extending angularly thereto, and means connecting and spacing the struts to register with the rows respectively, wherein the said fingers are angled in both a downward direction and in a direction oblique to said bight and wherein the row forming means is vertically slotted to receive said fingers to guide the downward movement of said turn-over frame.

3. In a doughnut cooking means embodying a sectional kettle frame adapted to be immersed in a frying liquid, said kettle frame comprising a pair of Z-beams having outwardly extending flanges along their upper edges and inwardly extending flanges along their lower edges, spaced apart members fixed along said beams on their inner faces between said flanges and providing pairs of registering slots at opposite sides of the frame, and divider members received in said slots to divide the frame into compartments, said divider members including a base, uprights at each end of the base, and spaced apart upstanding guides on said base.

4. In a doughnut cooking means embodying a sectional kettle frame adapted to be immersed in a frying liquid, said kettle frame having registering slots at opposite sides of the frame, and divider members received in said slots to divide the frame into compartments, said divider members including a base, uprights at each end of the base, and spaced apart upstanding guides, said guides comprising a pair of spring steel strips fixed on opposite sides of the base at their lower ends and fixedly brought together at their upper ends.

5. In a doughnut cooking means comprising a sectional kettle frame adapted to be immersed in a frying liquid, sections of said kettle frame being defined by an upstanding divider member carried thereby, a sectional basket frame adapted to be lowered into said kettle frame with sections of the basket frame received in sections of the kettle frame, sections of said basket frame being defined by laterally spaced apart foraminated members carried thereby, and a sectional turn-over frame adapted to be received in the basket frame with sections of the turn-over frame received in sections of the kettle frame, sections of the turn-over frame being defined by downwardly extending laterally spaced apart members carried thereby, said frames being selectively separable.

6. In a doughnut cooking means comprising a sectional kettle frame adapted to be immersed in a frying liquid, sections of said kettle frame being defined by an upstanding divider member carried thereby, and a sectional basket frame received in sections of the kettle frame, sections of said basket frame being defined by laterally spaced basket frame being defined by laterally spaced apart foraminated members carried thereby, runners securing the sections of the basket frame together, and handles for the basket frame.

7. In a doughnut cooking means for use with doughnut row forming means, a turn-over frame including a plurality of loop-shape vertical struts, each strut comprising a bight at its lower end and having a plurality of doughnut contact fingers spaced along said bight and extending angularly thereto, and means connecting and spacing the struts to register with the rows respectively, wherein the fingers are also loop-shape having bights at their outer ends.

8. In a doughnut cooking means for use with doughnut row forming means, a turn-over frame including a plurality of vertical struts, each strut having a horizontally extending member at its lower end and having a plurality of doughnut contact fingers spaced along said horizontally extending member and extending angularly thereto, and means connecting and spacing the struts to register with the rows respectively, wherein the said fingers are angled in both a downward direction and in a direction oblique to said bight.

CARL J. HORNKOHL.
FREELAND H. LESLIE.

REFERENCES CITED

The following references are of record in the file of this patent:

UNITED STATES PATENTS

| Number | Name | Date |
|---|---|---|
| 980,246 | Graham | Jan. 3, 1911 |
| 1,918,287 | Pieri | July 18, 1933 |
| 2,202,602 | Ruch | May 28, 1940 |

FOREIGN PATENTS

| Number | Country | Date |
|---|---|---|
| 25,352 | Great Britain | Nov. 14, 1911 |

Certificate of Correction

Patent No. 2,450,962.

October 12, 1948.

CARL J. HORNKOHL ET AL.

It is hereby certified that error appears in the printed specification of the above numbered patent requiring correction as follows:

Column 7, line 4, claim 6, strike out "basket frame being defined by laterally spaced";

and that the said Letters Patent should be read with this correction therein that the same may conform to the record of the case in the Patent Office.

Signed and sealed this 4th day of January, A. D. 1949.

[SEAL]

THOMAS F. MURPHY,
*Assistant Commissioner of Patents.*